(12) United States Patent
Kishimoto et al.

(10) Patent No.: US 9,598,740 B2
(45) Date of Patent: Mar. 21, 2017

(54) METHOD FOR PRODUCING SUGAR SOLUTION

(75) Inventors: Junpei Kishimoto, Kamakura (JP);
Hiroyuki Kurihara, Kamakura (JP);
Atsushi Minamino, Kamakura (JP);
Katsushige Yamada, Kamakura (JP)

(73) Assignee: Toray Industries, Inc. (JP)

( * ) Notice: Subject to any disclaimer, the term of this patent is extended or adjusted under 35 U.S.C. 154(b) by 85 days.

(21) Appl. No.: 13/984,566

(22) PCT Filed: Feb. 17, 2012

(86) PCT No.: PCT/JP2012/053771
§ 371 (c)(1),
(2), (4) Date: Aug. 9, 2013

(87) PCT Pub. No.: WO2012/111794
PCT Pub. Date: Aug. 23, 2012

(65) Prior Publication Data
US 2013/0312738 A1    Nov. 28, 2013

(30) Foreign Application Priority Data

Feb. 18, 2011   (JP) ................................ 2011-033398

(51) Int. Cl.
*C13K 13/00*     (2006.01)
*B01D 61/02*     (2006.01)
*B01D 61/14*     (2006.01)
*C13B 20/16*     (2011.01)
*C13K 1/02*      (2006.01)

(52) U.S. Cl.
CPC .......... *C13K 13/007* (2013.01); *B01D 61/025* (2013.01); *B01D 61/027* (2013.01); *B01D 61/145* (2013.01); *C13B 20/165* (2013.01); *C13K 1/02* (2013.01); *B01D 2311/04* (2013.01);
(Continued)

(58) Field of Classification Search
CPC .................................................... C13K 13/007
See application file for complete search history.

(56) References Cited

U.S. PATENT DOCUMENTS 3,700,591 A      10/1972  Higley
2004/0007525 A1   1/2004  Rabie et al.
(Continued)

FOREIGN PATENT DOCUMENTS

JP      2002-336000    11/2002
JP      2003-259900     9/2003
(Continued)

OTHER PUBLICATIONS

Membrane Filtration in the Sugar Industry A. Hinkova et al. Chemical Papers, vol. 54 (6a), pp. 375-382, 2000.*
(Continued)

*Primary Examiner* — Melvin C Mayes
*Assistant Examiner* — Douglas B Call
(74) *Attorney, Agent, or Firm* — DLA Piper LLP (US)

(57) ABSTRACT

A method of producing a sugar liquid, includes filtering a cellulose-derived sugar liquid through one or more separation membranes selected from the group consisting of ultrafiltration membranes, nanofiltration membranes and reverse osmosis membranes, and washing the separation membrane(s) after filtration with warm water at a temperature of not less than 50° C.

16 Claims, 3 Drawing Sheets

(52) U.S. Cl.
CPC .... *B01D 2311/25* (2013.01); *B01D 2319/025* (2013.01)

(56) References Cited

U.S. PATENT DOCUMENTS

| | | | |
|---|---|---|---|
| 2005/0056600 A1* | 3/2005 | Ranney | B01D 61/022 210/806 |
| 2005/0178729 A1 | 8/2005 | Rabie et al. | |
| 2011/0059497 A1* | 3/2011 | Beckler Andersen et al. | 435/161 |
| 2011/0250637 A1 | 10/2011 | Kurihara et al. | |
| 2013/0004994 A1* | 1/2013 | Hanakawa et al. | 435/72 |

FOREIGN PATENT DOCUMENTS

| | | |
|---|---|---|
| JP | 2005-65541 | 3/2005 |
| JP | 2005-278407 | 10/2005 |
| JP | 2009-240167 | 10/2009 |
| JP | 2010-029108 | 2/2010 |
| RU | 2 119 379 | 9/1998 |
| WO | 2010/067785 A1 | 6/2010 |
| WO | WO 2011/111451 * | 9/2011 |
| WO | 2011/162009 A1 | 12/2011 |

OTHER PUBLICATIONS

Fouling strategies and the cleaning system of NF membranes and factors affecting cleaning efficiency Ahmed Al-Amoudi, Robert W. Lovitt Journal of Membrane Science vol. 303, pp. 4-28, (2007).*

A. Hinkova, et al., "Membrane Filtration in the Sugar Industry," *Institute of Chemical Technology*, Mar. 19, 2000, pp. 375-382.

H. Lee, et al., "Cleaning Strategies for Flux Recovery of an Ultrafiltration Membrane Fouled by Natural Organic Matter," *Elsevier Science Ltd.*, 2001, vol. 35, No. 41, pp. 3301-3308.

S.K. Razavi, et al., "Fouling and cleaning of membranes in the ultrafiltration of the aqueous extract of soy flour," *Journal of Membrane Science*, vol. 114, No. 1, May 29, 1996, pp. 93-104.

Corresponding Supplemental European Search Report of EP Application No. 12746912.0 dated Sep. 9, 2014.

English translation of Russian Office Action dated Oct. 30, 2015 of corresponding Russian Application No. 2013142452.

* cited by examiner

METHOD FOR PRODUCING SUGAR
SOLUTION

TECHNICAL FIELD

This disclosure relates to a method of producing a sugar liquid from cellulose.

BACKGROUND

In recent years, utilization of biomass as an alternative material to petroleum has been drawing attention due to concerns about depletion of petroleum resources and global warming. In particular, methods of obtaining sugars by hydrolysis of biomass containing polysaccharides such as starch and cellulose have been actively studied. This is because various chemical products can be produced by microbial fermentation using sugars as feedstocks.

A cellulose-derived sugar liquid contains fine particles such as lignin, tannin, silica, calcium and undegraded cellulose; water-soluble macromolecules such as oligosaccharides, polysaccharides, tannin and enzymes; and low-molecular weight fermentation inhibitors; as impurities. In a known method of removing these impurities, fine particles are separated into the feed side by a microfiltration membrane, water-soluble macromolecules are separated into the feed side by an ultrafiltration membrane, and fermentation inhibitors are removed from the feed side by a nanofiltration membrane or reverse osmosis membrane (WO 2010/067785).

It could therefore be helpful to provide a method of producing a cellulose-derived sugar liquid using a separation membrane, wherein the separation membrane clogged with impurities in the cellulose-derived sugar liquid, especially with water-soluble macromolecules, is washed, thereby providing a method for effectively removing impurities from a cellulose-derived sugar liquid.

SUMMARY

We discovered that, in the process of removing impurities from a cellulose-derived sugar liquid using a separation membrane, clogging of the separation membrane occurs as the operation continues for a long time.

We thus provide (1) to (8) below:

(1) A method of producing a sugar liquid, the method comprising the step of filtering a cellulose-derived sugar liquid through one or more separation membranes selected from the group consisting of ultrafiltration membranes, nanofiltration membranes and reverse osmosis membranes, characterized in that the method comprises the step of washing the separation membrane(s) after the filtration with warm water at a temperature of not less than 50° C.
(2) The method of producing a sugar liquid according to (1), wherein the warm water comprises one or more compounds selected from the group consisting of HMF, furfural, coumaric acid, ferulic acid, coumaramide, ferulamide and vanillin.
(3) The method of producing a sugar liquid according to (1) or (2), wherein the warm water is a filtrate obtained by passing a cellulose-derived sugar liquid through a nanofiltration membrane or reverse osmosis membrane.
(4) The method of producing a sugar liquid according to any one of (1) to (3), wherein the temperature of the warm water is within the range of 75 to 90° C.
(5) The method of producing a sugar liquid according to any one of (1) to (4), wherein the cellulose-derived sugar liquid is a cellulose-derived sugar liquid filtered through a microfiltration membrane(s).
(6) The method of producing a sugar liquid according to any one of (1) to (5), wherein the pH of the warm water is within the range of 9 to 12.
(7) The method of producing a sugar liquid according to any one of (1) to (6), wherein the separation membrane(s) is/are washed by cross-flow filtration of the warm water through the separation membrane(s).
(8) The method of producing a sugar liquid according to (7), wherein the linear velocity of the warm water on the membrane surface is 5 to 50 cm/sec.

Impurities specific to cellulose-derived sugar liquids that cause clogging of a separation membrane can thus be removed at low cost while deterioration of the membrane is suppressed so that the clogged separation membrane can be reused in the production process of a cellulose-derived sugar liquid.

DESCRIPTION OF SYMBOLS

Figure 1:
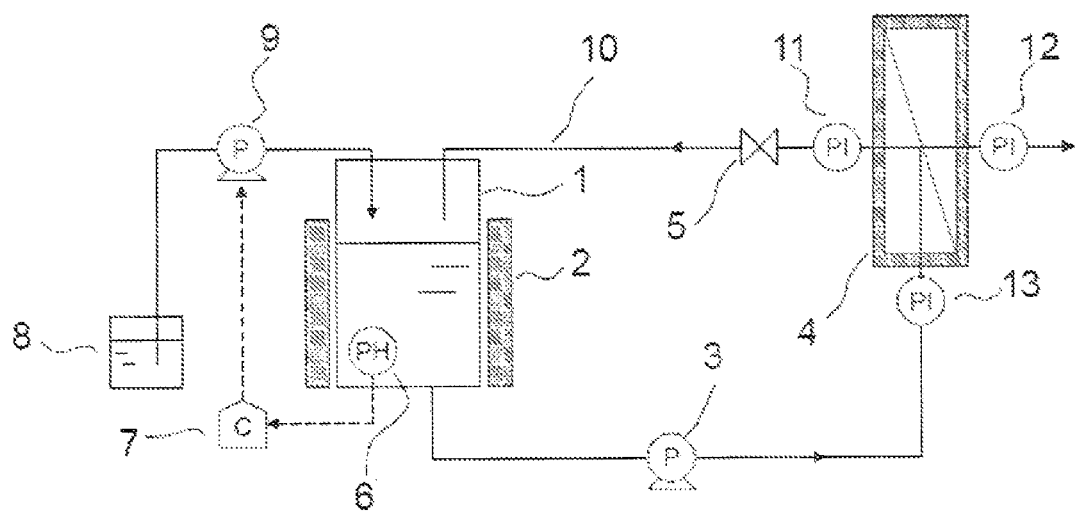
FIG. 1 is a schematic diagram showing a basic constitution of a separation membrane washing device.

1 Washing liquid-retaining tank
2 Incubator
3 Circulation pump
4 Cross-flow membrane module
5 Valve
6 pH meter
7 Controller
8 Acid/alkali tank
9 pH control pump
10 Circulation line
11 Pressure gauge
12 Pressure gauge
13 Pressure gauge
14 Sugar liquid supply tank
15 Sugar liquid sending pump
16 Three-way valve
17 Three-way valve
21 Saccharification reaction tank
22 Slurry transfer means
23 Incubator
24 Solid-liquid separation device
25 Solid residue
26 Incubator 27 Supply tank for ultrafiltration membrane
28 Supply pump for ultrafiltration membrane
29 Incubator
30 Ultrafiltration membrane module
31 Supply tank for nanofiltration membrane
32 Supply pump for nanofiltration membrane
33 Incubator
34 Nanofiltration membrane module
35 Supply tank for reverse osmosis membrane
36 Supply pump for reverse osmosis membrane
37 Incubator
38 pH control mechanism
39 Reverse osmosis membrane module
40 Membrane washing pump
41 Filtrate tank for reverse osmosis membrane
42 Reverse osmosis membrane filtrate tank pump
43 Incubator
44 pH control mechanism

DETAILED DESCRIPTION

The cellulose-derived sugar liquid means a sugar liquid obtained as a result of hydrolysis of a woody or herbaceous biomass, which is a cellulose-containing biomass. The method of hydrolysis of the cellulose-containing biomass is not limited, and the method is preferably a method wherein an acid, alkali, saccharifying enzyme and/or the like are appropriately combined. The cellulose-derived sugar liquid contains monosaccharides such as glucose, xylose and mannose; and water-soluble polysaccharides such as cellobiose, cellooligosaccharides and xylooligosaccharides. Such saccharides can be used as fermentation feedstocks (carbon sources) for microorganisms, and can be converted by the microorganisms into ethanol, lactic acid, amino acid and/or the like.

Further, as components other than such saccharides, cellulose-derived sugar liquids contain various impurities such as fine particles including lignin, tannin, silica, calcium and undegraded cellulose; water-soluble macromolecules including oligosaccharides, polysaccharides, tannin and enzymes; and low-molecular weight fermentation inhibitors; which have not been degraded by the process of hydrolysis. Such impurities can be classified into two types, that is, water-soluble components and water-insoluble components. The water-insoluble components are preferably removed as solids in advance by solid-liquid separation of the cellulose-derived sugar liquid.

Examples of the method of solid-liquid separation of a cellulose-derived sugar liquid include methods such as centrifugation and filtration through a microfiltration membrane. Since filtration through a microfiltration membrane enables removal of even micron-sized water-insoluble components, the cellulose-derived sugar liquid of the present invention is preferably subjected to filtration through a microfiltration membrane before the later-mentioned filtration through a separation membrane(s). The microfiltration membrane may be a microfiltration membrane described in WO 2010/067785.

The cellulose-derived sugar liquid is filtered through one or more separation membranes selected from ultrafiltration membranes, nanofiltration membranes and reverse osmosis membranes. Filtration of the cellulose-derived sugar liquid through a separation membrane(s) may be carried out according to the method described in WO 2010/067785. Similarly, the separation membrane(s) may be a separation membrane(s) described in WO 2010/067785.

In cases where the cellulose-derived sugar liquid is filtered through the above-described separation membrane(s), clogging of the separation membrane(s) occur as the use of the membrane(s) continues for a long time. In our method, the separation membrane(s) is/are washed with warm water (hereinafter also referred to as a washing liquid) to prevent clogging. The step of washing the separation membrane(s) with warm water (hereinafter also referred to as the membrane washing step) is described below.

In the membrane washing step, the separation membrane is washed with warm water at a temperature of not less than 50° C. This is because only in cases where warm water at a temperature of not less than 50° C. is used for the washing, components that are attaching to the surface and the inside of the separation membrane(s), and thereby causing membrane clogging, can be effectively removed, resulting in remarkable recovery of the filtration rate of the separation membrane(s). As the temperature of the warm water increases, the effect can be increased further, and the maximum washing effect can be obtained at a temperature of not less than about 75° C. However, at a temperature higher than 90° C., the separation membrane itself is damaged due to heat. Hence, filtration performance of the membrane may rather decrease. Accordingly, the preferred temperature range of the warm water is 75 to 90° C. Further, during membrane washing, the temperature of the warm water is preferably maintained within a desired temperature range by a temperature control mechanism.

In the membrane washing step using warm water, the washing effect can be further increased by inclusion of one or more low-molecular-weight aromatic compounds selected from the group consisting of HMF, furfural, coumaric acid, ferulic acid, coumaramide, ferulamide and vanillin in the warm water. This is thought to be due to affinity of lignin-derived aromatic compounds in the components causing clogging of the separation membrane with the low-molecular-weight aromatic compounds. However, the mechanism is unclear. The total concentration of the low-molecular-weight aromatic compounds in the warm water is preferably 50 to 10000 ppm, more preferably 5000 to 10000 ppm.

Although the warm water containing the low-molecular-weight aromatic compounds may also be prepared by adding the low-molecular-weight aromatic compounds to warm water, warm water originally containing the low-molecular-weight aromatic compounds is preferably employed. More specifically, for example, a filtrate obtained by passing a cellulose-derived sugar liquid through a nanofiltration membrane and/or reverse osmosis membrane (hereinafter referred to as an NF filtrate or the like) is known to contain the low-molecular-weight aromatic compounds, so that the warm water may be an NF filtrate or the like that was warmed to a temperature of not less than 50° C. In a production process of a cellulose-derived sugar liquid, the NF filtrate or the like is usually discarded as waste liquid. Reuse of the NF filtrate or the like as a washing liquid allows water saving and is, therefore, economically advantageous.

In long-term use of a separation membrane, the degree of recovery of the filtration rate may gradually decrease in cases where the washing with warm water is carried out alone. In such cases, the washing effect can be further improved by adjusting the pH of the warm water to an alkaline pH of not less than 9, preferably not less than 11 during the washing with warm water. This is assumed to be due to high solubility of aromatic compounds such as p-hydroxybenzoic acid, ferulic acid, coumaric acid and guaiacol; peptides; proteins; and the like; at the above-described pH, but the reason is not clear. Such membrane washing with warm water at a pH of not less than 9 does not need to be carried out periodically and every time, and may be carried out by setting a washing condition such as washing 10 times with normal warm water at a temperature of not less than 50° C. followed by washing once with warm water at a pH of not less than 9. By this, high washing effect can be obtained while the amount of alkali to be used and the amount of alkali waste liquid are suppressed. Since warm water at a pH of not less than 12 may damage the membrane and hence decrease the filtration performance of the membrane, the pH of the warm water is preferably within the range of 11 to 12. During the membrane washing, the pH of the washing liquid is preferably maintained within a desired range by a pH control mechanism.

Examples of the method of washing the separation membrane with warm water include a method wherein the separation membrane is immersed in warm water, a method wherein warm water is subjected to dead-end filtration, and a method wherein warm water is subjected to cross-flow filtration through the separation membrane. Among these, the method wherein warm water is subjected to cross-flow filtration through the separation membrane is preferred since formation of a flow parallel to the membrane surface allows the washing process to proceed while components causing clogging are washed away after their removal by warm water.

In the membrane washing by cross-flow filtration of warm water through the separation membrane, the linear velocity of the washing liquid on the membrane surface is preferably 5 to 50 cm/sec., more preferably 30 to 50 cm/sec. This is because, in cases where the linear velocity is less than 5 cm/sec., the washing effect on the surface of the separation membrane is insufficient, while in cases where the linear velocity is more than 50 cm/sec., the effect on the washing hardly changes even if the linear velocity on the membrane surface is further increased. The linear velocity of the washing liquid on the membrane surface can be controlled by increasing or decreasing the flow rate of a washing liquid sending pump.

In the membrane washing method by cross-flow filtration of warm water through the separation membrane, the transmembrane pressure difference is not limited, but for washing the inside of pores on the separation membrane, it is preferred to carry out the washing while applying a transmembrane pressure difference. The transmembrane pressure difference to be applied is preferably 5 kPa to 2 MPa in cases of a ultrafiltration membrane, and 0.5 to 7 MPa in cases of a nanofiltration membrane or reverse osmosis membrane. The transmembrane pressure difference means the difference in the pressure caused between both sides of a membrane during membrane treatment, that is, the differential pressure between the unfiltered-solution (concentrate) side and the filtrate side. In cases where the transmembrane pressure difference during washing is lower than the above-described range, the amount of the washing liquid that passes through pores of the membrane is extremely small so that the inside of the pores cannot be washed sufficiently, which is not preferred. On the other hand, in cases where the transmembrane pressure difference during washing is higher than the above-described range, the amount of liquid that passes through pores of the membrane is too large. Hence, a large amount of washing liquid is consumed, which is economically disadvantageous. Although depending on the type of the membrane, the filtration flux of the washing liquid is usually about 0.05 to 0.5 m/day at a membrane surface linear velocity and a transmembrane pressure difference within the above-described ranges.

The effect of membrane washing by the membrane washing step is evaluated based on the extent of recovery of the membrane filtration flux by the washing, which membrane filtration flux has decreased due to clogging relative to that of an unused membrane. That is, the filtration flux of each of the clogged membrane before washing and the clogged membrane after washing divided by the filtration flux of an unused membrane is defined as the filtration percentage (%), and the difference in the filtration percentage caused by the washing, or the level of the filtration percentage after the washing, was used for evaluation of the washing effect. It should be noted that the maximum value of the filtration percentage is theoretically 100%. In terms of membrane treatment of a cellulose-derived sugar liquid, a membrane whose filtration percentage decreased to less than 70% was judged as unusable since the membrane is not suitable for practical use because of its low processing speed, while a membrane whose filtration percentage was not less than 70% was judged as usable for membrane treatment of a sugar liquid since the membrane is sufficiently practical in view of the processing speed. That is, the membrane washing step enables reuse of a separation membrane with a decreased filtration percentage of less than 70% for filtration of a cellulose-derived sugar liquid, by recovering the filtration percentage to not less than 70%.

Examples of our methods are described below. The apparatus for carrying out the methods at least comprises a washing liquid-retaining tank having a function to control the temperature of the washing liquid, and a liquid-sending pump for sending the washing liquid to the membrane. Further, the apparatus preferably comprises a circulation pump and a circulation line to circulate the washing liquid, a valve to control the pressure by the washing liquid on the membrane surface, and a temperature control mechanism that controls the temperature of the washing liquid to a desired temperature. Further, the apparatus preferably comprises a pH control mechanism that controls the pH of the washing liquid to a desired value. The apparatus for carrying out the methods is described below with reference to the drawings. In the drawings, each solid line arrow indicates a flow of a liquid or solid and a pipe, and each dotted line arrow indicates a flow of an electric signal and a wire.

Figure 2:
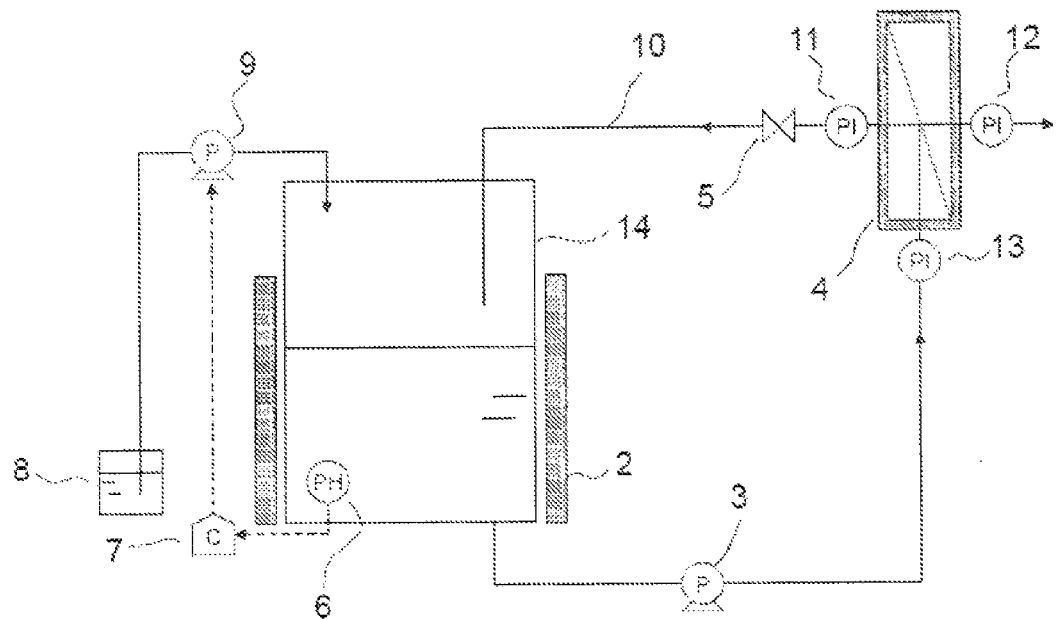
FIG. 2 is a schematic diagram showing a constitution of a separation membrane washing device having a function to perform membrane treatment of a sugar liquid as well as a function to perform washing of a separation membrane.
Figure 3:
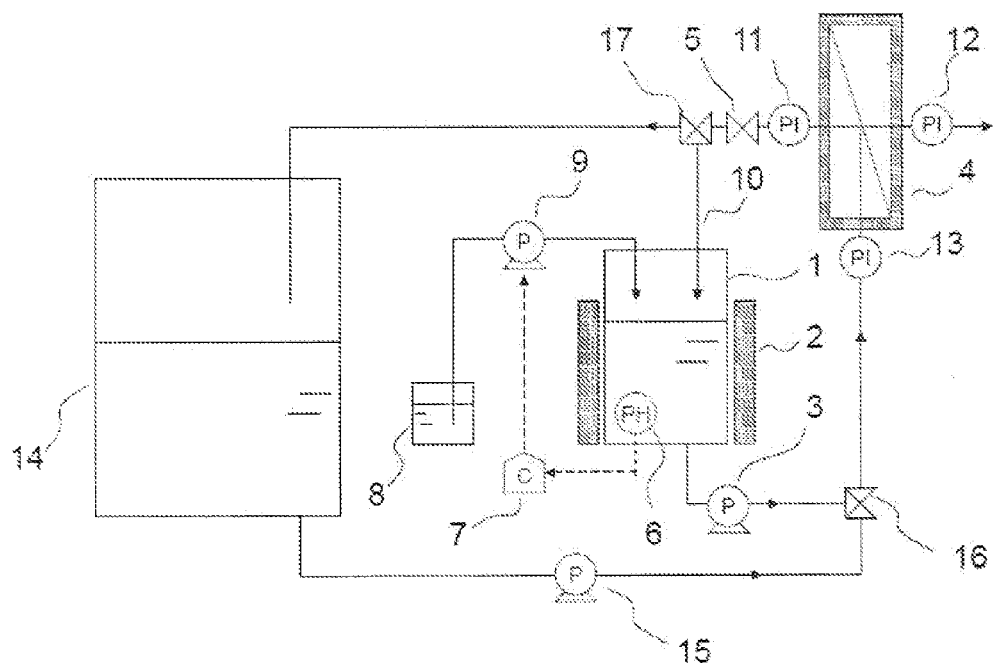
FIG. 3 is a schematic diagram showing a constitution of a separation membrane washing device independently having each of a function to perform membrane treatment of a sugar liquid and a function to perform washing of a separation membrane.
Figure 4:
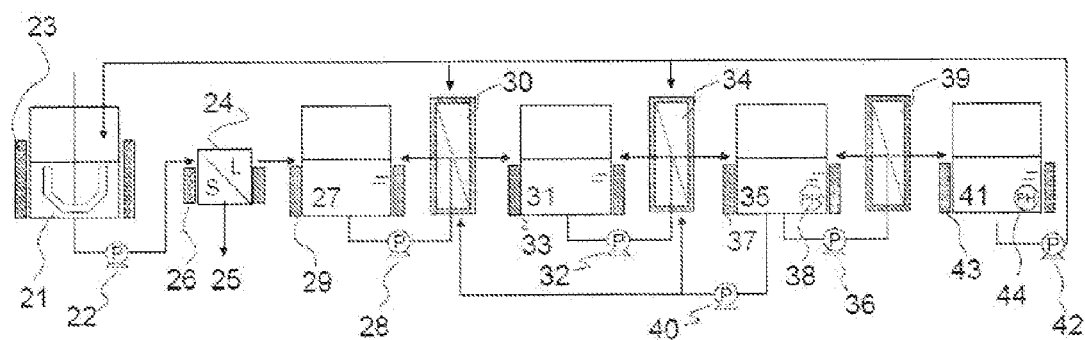
FIG. 4 is a general schematic view of a system for production of a cellulose-derived sugar liquid from a pretreated product of a cellulose-containing biomass.

FIG. 1 is a schematic diagram showing an example of the most basic constitution of an apparatus for carrying out our methods. FIG. 2 is a schematic diagram showing an application example provided by including the requirements included in FIG. 1 and making the washing liquid-retaining tank also have a function as a sugar liquid supply tank 14 for use in membrane treatment of the sugar liquid. FIG. 3 is a schematic diagram showing an application example that includes, in addition to the requirements included in FIG. 1, an independent membrane treatment system for the sugar liquid, wherein operation of valves allows switching between the membrane treatment step and the membrane washing step. FIG. 4 is a general schematic view of a system that produces a cellulose-derived sugar liquid from a pretreated product of a cellulose-containing biomass.

The apparatus in FIG. 1 is described below in detail. A washing liquid-retaining tank 1 that retains a washing liquid comprises an incubator 2 that incubates the washing liquid and a pH control mechanism that controls the pH of the washing liquid. The pH control mechanism is composed of: a pH meter 6 that measures the pH of the washing liquid and outputs the measured pH value as an electric signal; a controller 7 that calculates, based on the input pH value signal, the difference between a preset pH value and the current pH value, and then outputs the calculated value as an electric signal for controlling driving of a pH control pump 9; a pH control pump 9 that drives in response to the input signal; and an acid/alkali tank 8 that retains an acid or alkali for controlling the pH. The washing liquid retained in the washing liquid-retaining tank 1 is supplied to a cross-flow membrane module 4 by a circulation pump 3 capable of controlling the flow rate of the liquid. Thereafter, the washing liquid passes through a circulation line 10 and returns again to the washing liquid-retaining tank. The transmembrane pressure difference can be controlled by the degree of opening/closing of a valve 5 and by controlling the flow rate with the circulation pump. The transmembrane pressure difference can be calculated using pressure gauges 11 to 13. That is, the difference between the mean of the values measured by the pressure gauge 11 and the pressure gauge 13 and the value measured by the pressure gauge 12 can be regarded as the transmembrane pressure difference.

The apparatus in FIG. 2 is described below in detail. The apparatus shown in FIG. 2 has both a function to perform membrane treatment of the sugar liquid and a function to perform membrane washing. A sugar liquid supply tank 14 that retains the sugar liquid during the membrane treatment of the sugar liquid is used also as a washing liquid-retaining tank during washing of the membrane, and comprises an incubator 2 that incubates the washing liquid, and a pH control mechanism that controls the pH of the washing liquid. The pH control mechanism is composed of: a pH meter 6 that measures the pH of the washing liquid and outputs the measured pH value as an electric signal; a controller 7 that calculates, based on the input pH value signal, the difference between a preset pH value and the current pH value, and then outputs the calculated value as an electric signal for controlling driving of a pH control pump 9; a pH control pump 9 that drives in response to the input signal; and an acid/alkali tank 8 that retains an acid or alkali for controlling the pH. During washing, the washing liquid retained in the sugar liquid supply tank 14 is supplied to a cross-flow membrane module 4 by a circulation pump 3 capable of controlling the flow rate of the liquid. Thereafter, the washing liquid passes through a circulation line 10 and returns again to the washing liquid-retaining tank. The transmembrane pressure difference can be controlled by the degree of opening/closing of a valve 5 and by controlling the flow rate with the circulation pump. The transmembrane pressure difference can be calculated using pressure gauges 11 to 13. That is, the difference between the mean of the values measured by the pressure gauge 11 and the pressure gauge 13 and the value measured by the pressure gauge 12 can be regarded as the transmembrane pressure difference.

The apparatus in FIG. 3 is described below in detail. The apparatus shown in FIG. 3 separately functions to perform membrane treatment of saccharides and membrane washing. Operation of three-way valves 16 and 17 allows switching between these functions. In the membrane treatment of the sugar liquid, the sugar liquid fed to a sugar liquid supply tank 14 is sent to a cross-flow membrane module 4 by a sugar liquid sending pump 15. In terms of membrane washing, a washing liquid-retaining tank 1 that retains the washing liquid comprises an incubator 2 that incubates the washing liquid, and a pH control mechanism that controls the pH of the washing liquid. The pH control mechanism is composed of: a pH meter 6 that measures the pH of the washing liquid and outputs the measured pH value as an electric signal; a controller 7 that calculates, based on the input pH value signal, the difference between a preset pH value and the current pH value, and then outputs the calculated value as an electric signal to control driving a pH control pump 9; a pH control pump 9 that drives in response to the input signal; and an acid/alkali tank 8 that retains an acid or alkali for controlling the pH. The washing liquid retained in the washing liquid-retaining tank 1 is supplied to a cross-flow membrane module 4 by a circulation pump 3 capable of controlling the flow rate of the liquid. Thereafter, the washing liquid passes through a circulation line 10 and returns again to the washing liquid-retaining tank. The transmembrane pressure difference can be controlled by the degree of opening/closing of a valve 5 and by controlling the flow rate with the circulation pump. The transmembrane pressure difference can be calculated using pressure gauges 11 to 13. That is, the difference between the mean of the values measured by the pressure gauge 11 and the pressure gauge 13 and the value measured by the pressure gauge 12 can be regarded as the transmembrane pressure difference.

The apparatus in FIG. 4 is described below in detail. The cellulose-containing biomass is mixed with a saccharifying enzyme in a saccharification reaction tank 21, to perform hydrolysis. The slurry after the saccharification reaction is transferred by a slurry transfer means 22 to a solid-liquid separation device 24, and separated into a solid residue 25 and a primary sugar liquid. The primary sugar liquid is retained in a supply tank 27 for an ultrafiltration membrane, and then supplied by a supply pump 28 for an ultrafiltration membrane to an ultrafiltration membrane module 30, wherein the primary sugar liquid is separated into a macromolecule concentrate and a secondary sugar liquid (filtrate). The macromolecule concentrate is circulated by the supply tank 27 for an ultrafiltration membrane and the supply pump 28 for an ultrafiltration membrane, to be further concentrated. The secondary sugar liquid is retained in a supply tank 31 for a nanofiltration membrane, and then supplied by a supply pump 32 for a nanofiltration membrane to a nanofiltration membrane module 34, wherein the secondary sugar liquid is separated into a concentrated sugar liquid and an NF filtrate. The concentrated sugar liquid is circulated by the supply tank 31 for a nanofiltration membrane and the supply pump 32 for a nanofiltration membrane, to be further concentrated. The NF filtrate is retained in a supply tank 35 for a reverse osmosis membrane, and then supplied by a supply pump 36 for a reverse osmosis membrane to a reverse osmosis membrane module 39, wherein the NF filtrate is separated into an RO concentrate and an RO filtrate. The RO concentrate is circulated by the supply tank 35 for a reverse osmosis membrane and the supply pump 36 for a reverse osmosis membrane, to be further concentrated. The RO concentrate is returned from the supply tank 35 for a reverse osmosis membrane by a membrane washing pump 40 to the ultrafiltration membrane module 30 and the nanofiltration membrane module 34, and reused to wash the membrane modules. The supply tank 35 for a reverse osmosis membrane comprises an incubator 37 that incubates the liquid in the tank and a pH control mechanism 38 that controls the pH of the liquid in the tank. The RO filtrate is retained in a filtrate tank 41 for a reverse osmosis membrane and, as required, returned by a reverse osmosis membrane filtrate tank pump 42 to the saccharification reaction tank 21, ultrafiltration membrane module 30 and nanofiltration membrane module 34, to be reused to control the concentration of solids in the saccharification reaction and wash the membrane modules. The filtrate tank 41 for a reverse osmosis membrane comprises an incubator 43 that incubates the liquid in the tank and a pH control mechanism 44 that controls the pH of the liquid in the tank. Each of the saccharification reaction tank 21, solid-liquid separation device 24, supply tank 27 for an ultrafiltration membrane and supply tank 31 for a nanofiltration membrane comprises an incubator (23, 26, 29 or 33, respectively), and each step can therefore be carried out while the temperature of the sugar liquid is maintained.

EXAMPLES

Examples of our methods are described below, but this disclosure is not limited thereto.

Reference Example 1

Method of Preparing Clogged Membrane

To evaluate the effect of membrane washing accurately, many membranes with the same contamination condition need to be prepared. A method of preparing such membranes is described below.

As a cellulose-containing biomass, rice straw that was pulverized to 2 mm was used. The cellulose-containing biomass was immersed in water, and processed using an autoclave (manufactured by Nitto Koatsu Co., Ltd.) at 180° C. for 5 minutes with stirring. The pressure at that time was 10 MPa. Thereafter, the processed biomass component was subjected to solid-liquid separation by centrifugation (3000 G). To the solution component, "Accellerase DUET" (manufactured by Genencor Kyowa Co. Ltd.) was added, and the reaction allowed to proceed at 50° C. for 24 hours to obtain a sugar liquid derived from the solution component. Thereafter, treatment with a filter press (manufactured by Yabuta Industries Co., Ltd., MO-4) was carried out to remove undegraded cellulose and lignin, to obtain a biomass-derived sugar liquid. Further, by subjecting the sugar liquid to filtration through a microfiltration membrane with a pore size of 0.22 µm, micron-sized water-insoluble components were removed. The thus obtained sugar liquid in an amount of about 40 L was subjected to filtration through a spiral membrane module composed of an ultrafiltration membrane, nanofiltration membrane or reverse osmosis membrane. Irrespective of the type of the membrane, the operation temperature was set to 50° C. and the membrane surface linear velocity was set to 20 cm/sec. The operation pressure under which the filtration was carried out was 0.1 MPa in the case of an ultrafiltration membrane, 2 MPa in the case of a nanofiltration membrane, and 4 MPa in the case of a reverse osmosis membrane. The operation was stopped when the filtration flux decreased to not more than 0.05 m/day. Each spiral membrane module whose filtration flux was decreased by such an operation was disassembled, and the membrane portion was cut into the form of a sheet with a size of 190 mm×140 mm.

In the Examples below, the thus obtained sheet-shaped membranes were subjected to washing tests and permeation tests using a compact flat membrane unit "SEPA CF-II" (manufactured by GE Osmonics; effective membrane area, 140 cm$^2$) that can be used as a compact filtration tester for a spiral membrane module.

Reference Example 2

Method of Measuring Filtration Flux and Method of Evaluating Membrane Washing Effect The filtration flux measurement was carried out at a temperature of 25° C. and a membrane surface linear velocity of 20 cm/sec. for both the ultrafiltration membrane and the reverse osmosis membrane. The operation pressure was set to 0.1 Mpa in the case of an ultrafiltration membrane, 2 MPa in the case of a nanofiltration membrane, and 4 MPa in the case of a reverse osmosis membrane. Under these conditions, pure water was filtered for 1 minute, and the mean filtration flux (m/day) during this process was measured. At this time, circulation of the cross flow was not carried out, and the cross flow was directly discharged. As a membrane separation device, a compact flat membrane unit corresponding to the spiral module described in Reference Example 1 was used.

In the Examples below, the filtration flux was measured by the above-described operation for each of an unused membrane, a clogged membrane before washing, and a clogged membrane after washing. The measured value of the filtration flux for each of the clogged membrane before washing and the clogged membrane after washing divided by the measured value of the filtration flux for the unused membrane was defined as the filtration percentage (%), and recovery of the filtration percentage by the washing, or the level of the filtration percentage after the washing, was used for evaluation of the membrane washing effect. It should be noted that the maximum value of the filtration percentage is theoretically 100%.

Reference Example 3

Analysis of Low-Molecular-Weight Aromatic Compounds by HPLC

The concentrations of HMF, furfural, coumaric acid, ferulic acid, coumaramide, ferulamide and vanillin in the aqueous solution were quantified under the following HPLC conditions based on comparison with standard samples. Since standard samples for coumaramide and ferulamide were not commercially available, they were obtained by custom synthesis (manufacturer: VSN).
Apparatus: high-performance liquid chromatograph "Lachrom elite" (manufactured by Hitachi, Ltd.)
Column: "Synergi 2.5 µm Hydro-RP 100A" (manufactured by Phenomenex)
Detection method: Diode Array detector
Flow rate: 0.6 mL/min.
Temperature: 40° C.

Example 1

Washing of Ultrafiltration Membrane with Warm Water

A heat-resistant ultrafiltration membrane (manufactured by DESAL; "HWS UF" series) having a decreased filtration flux obtained by the method in Reference Example 1 was subjected to membrane washing at 8 kinds of warm water temperatures of 25° C., 30° C., 40° C., 50° C., 60° C., 70° C., 80° C. and 90° C., at 4 kinds of pHs of 5, 7, 9 and 11 for each of the temperatures. That is, the membrane washing was carried out under the total of 32 kinds of conditions. Using 2 L of pure water as the warm water, 20 minutes of membrane washing was carried out at an operation pressure of 0.1 MPa at a membrane surface linear velocity of 30 cm/sec, with circulation of the cross flow. As a membrane separation device, a compact flat membrane unit corresponding to the spiral module described in Reference Example 1 was used. The filtration flux was measured by the method in Reference Example 2 before and after membrane washing. The filtration flow rate before membrane washing was regarded as the same among all conditions, and the value measured for one of the conditions was regarded as the filtration flux before membrane washing common to all conditions. Values of the filtration percentage converted from the filtration flux according to Reference Example 2 are shown in Table 1. The measured value of the filtration flux of the unused membrane was 0.258 m/day. As is evident from Table 1, the membrane filtration performance was remarkably recovered in cases where membrane washing was carried out with warm water at a temperature of not less than 50° C. Moreover, at temperatures of not less than 50° C., the membrane filtration performance was further recovered under alkaline conditions at pHs of not less than 9.

TABLE 1

| Washing temperature | Filtration percentage after washing (%) | | | |
|---|---|---|---|---|
| (° C.) | pH 5 | pH 7 | pH 9 | pH 11 |
| 25 | 51 | 53 | 57 | 58 |
| 30 | 51 | 52 | 56 | 59 |
| 40 | 52 | 55 | 58 | 65 |
| 50 | 71 | 72 | 79 | 89 |
| 60 | 82 | 85 | 93 | 96 |
| 70 | 94 | 96 | 98 | 97 |
| 80 | 95 | 96 | 99 | 97 |
| 90 | 94 | 96 | 98 | 97 |
| | Filtration percentage before washing (%) | | | 27 |

Example 2

Washing of Nanofiltration Membrane with Warm Water

A heat-resistant nanofiltration membrane (manufactured by DESAL; "HWS NF" series) having a decreased filtration flux obtained by the method in Reference Example 1 was subjected to membrane washing under the same conditions as in Example 1 except that the operation pressure was 2 MPa. Values of the filtration percentage converted from the filtration flux according to Reference Example 2 are shown in Table 2. The measured value of the filtration flux of the unused membrane was 0.246 m/day. As a result, as is evident from Table 2, the membrane filtration performance was remarkably recovered in cases where membrane washing was carried out with warm water at a temperature of not less than 50° C. Moreover, at temperatures of not less than 50° C., the membrane filtration performance was further recovered under alkaline conditions at pHs of not less than 9.

TABLE 2

| Washing temperature | Filtration percentage after washing (%) | | | |
|---|---|---|---|---|
| (° C.) | pH 5 | pH 7 | pH 9 | pH 11 |
| 25 | 50 | 50 | 54 | 57 |
| 30 | 51 | 51 | 54 | 57 |
| 40 | 52 | 52 | 55 | 62 |
| 50 | 71 | 71 | 77 | 86 |
| 60 | 85 | 86 | 94 | 96 |
| 70 | 95 | 96 | 99 | 99 |
| 80 | 98 | 98 | 99 | 99 |
| 90 | 98 | 98 | 99 | 99 |
| | Filtration percentage before washing (%) | | | 30 |

Example 3

Washing of Reverse Osmosis Membrane with Warm Water

A heat-resistant reverse osmosis membrane (manufactured by DESAL; "HWS RO" series) having a decreased filtration flux obtained by the method in Reference Example 1 was subjected to membrane washing under the same conditions as in Example 1 except that the operation pressure was 4 MPa. Values of the filtration percentage converted from the filtration flux according to Reference Example 2 are shown in Table 3. The measured value of the filtration flux of the unused membrane was 0.245 m/day. As a result, as is evident from Table 3, the membrane filtration performance was remarkably recovered in cases where membrane washing was carried out with warm water at a temperature of not less than 50° C. Moreover, at temperatures of not less than 50° C., the membrane filtration performance was further recovered under alkaline conditions at pHs of not less than 9.

TABLE 3

| Washing temperature | Filtration percentage after washing (%) | | | |
|---|---|---|---|---|
| (° C.) | pH 5 | pH 7 | pH 9 | pH 11 |
| 25 | 50 | 51 | 55 | 57 |
| 30 | 50 | 51 | 56 | 58 |
| 40 | 51 | 53 | 56 | 64 |
| 50 | 68 | 71 | 79 | 89 |
| 60 | 85 | 87 | 95 | 97 |
| 70 | 95 | 97 | 99 | 99 |
| 80 | 97 | 98 | 100 | 100 |
| 90 | 97 | 98 | 99 | 99 |
| | Filtration percentage before washing (%) | | | 28 |

Example 4

Influence of Membrane Surface Linear Velocity on Membrane Washing Effect

A heat-resistant nanofiltration membrane (manufactured by DESAL; "HWS NF" series) having a decreased filtration flux obtained by the method in Reference Example 1 was subjected to membrane washing under the same conditions as in Example 2 except that a total of 6 kinds of membrane surface linear velocities, 5 cm/sec, 10 cm/sec, 30 cm/sec, 50 cm/sec, 70 cm/sec and 90 cm/sec, were employed. Values of the filtration percentage converted from the filtration flux according to Reference Example 2 are shown in Table 4. The measured value of the filtration flux of the unused membrane was 0.246 m/day. As a result, as is evident from Table 4, the membrane filtration performance was remarkably recovered at membrane surface linear velocities of not less than 30 cm/sec, and reached the upper limit at 50 cm/sec. and higher. On the other hand, also at the membrane surface linear velocity of 5 cm/sec., recovery of the membrane filtration performance was excellent and a filtration percentage of 88% was obtained but, since the value was largely different from the values observed at not less than 10 cm/sec., it was assumed that the membrane filtration performance may be remarkably low at a membrane surface linear velocity of less than 5 cm/sec.

TABLE 4

| Membrane surface linear velocity (cm/sec) | Filtration percentage after washing (%) |
|---|---|
| 5 | 88 |
| 10 | 93 |
| 30 | 97 |
| 50 | 98 |
| 70 | 98 |
| 90 | 98 |
| Filtration percentage before washing (%) | 30 |

Example 5

Membrane Washing with Warm Water Containing Low-Molecular-Weight Aromatic Compounds A heat-resistant nanofiltration membrane (manufactured by DESAL; "HWS NF" series) having a decreased filtration flux obtained by the method in Reference Example 1 was subjected to membrane washing at 50° C. at pH 7 (adjusted by use of sodium hydroxide) under 6 kinds of conditions wherein an aqueous solution containing any one of the low-molecular-weight aromatic compounds selected from the group consisting of HMF, furfural, coumaric acid, ferulic acid, coumaramide, ferulamide and vanillin in pure water at a concentration of 0.5 g/L was used as the washing liquid and a condition wherein pure water without addition of a low-molecular-weight aromatic compound was used as the washing liquid. That is, the membrane washing was carried out under the total of 7 kinds of conditions. Using 2 L of each of the washing liquids, 20 minutes of membrane washing was carried out at an operation pressure of 0.1 MPa at a membrane surface linear velocity of 30 cm/sec, with circulation of the cross flow. As a membrane separation device, a compact flat membrane unit corresponding to the spiral module described in Reference Example 1 was used. The filtration flux was measured according to the method in Reference Example 2 before and after membrane washing. The filtration flow rate before membrane washing was regarded as the same among all conditions, and the value measured for one of the conditions was regarded as the filtration flux before membrane washing common to all conditions. Values of the filtration percentage converted from the filtration flux according to Reference Example 2 are shown in Table 5. The measured value of the filtration flux of the unused membrane was 0.246 m/day. As is evident from Table 5, better recovery of the membrane filtration performance was observed in the cases where the warm water at 50° C. containing a low-molecular-weight aromatic compound was used than in the cases where pure water at 50° C. was used.

Comparative Example 1

Membrane Washing with Water at Normal Temperature Containing Low-Molecular-Weight Aromatic Compound Membrane washing was carried out under the same conditions as in Example 5 except that the temperature of the washing liquid was 25° C. Values of the filtration percentage converted from the filtration flow rate according to Reference Example 2 are shown in Table 5. The measured value of the filtration flow rate of the unused membrane was 0.246 m/day. As is evident from Table 5, no difference was found at all between the case where pure water at 25° C. was used and the cases where the aqueous solution at 25° C. containing a low-molecular-weight aromatic compound was used. From these results and the results in Example 5, it was shown that the improvement in the membrane washing effect by a low-molecular-weight aromatic compound can be achieved only in cases where the temperature of the washing liquid is not less than 50° C.

TABLE 5

| Washing temperature (° C.) | Filtration percentage after washing (%) | | | | | | | |
|---|---|---|---|---|---|---|---|---|
| | No addition | Compound added (500 ppm) | | | | | | |
| | | HMF | Furfural | Coumaric acid | Ferulic acid | Coumaramide | Ferulamide | Vanillin |
| 50 | 72 | 75 | 75 | 75 | 76 | 76 | 75 | 75 |
| 25 | 50 | 51 | 52 | 50 | 51 | 50 | 50 | 52 |

Example 6

Figure 5:
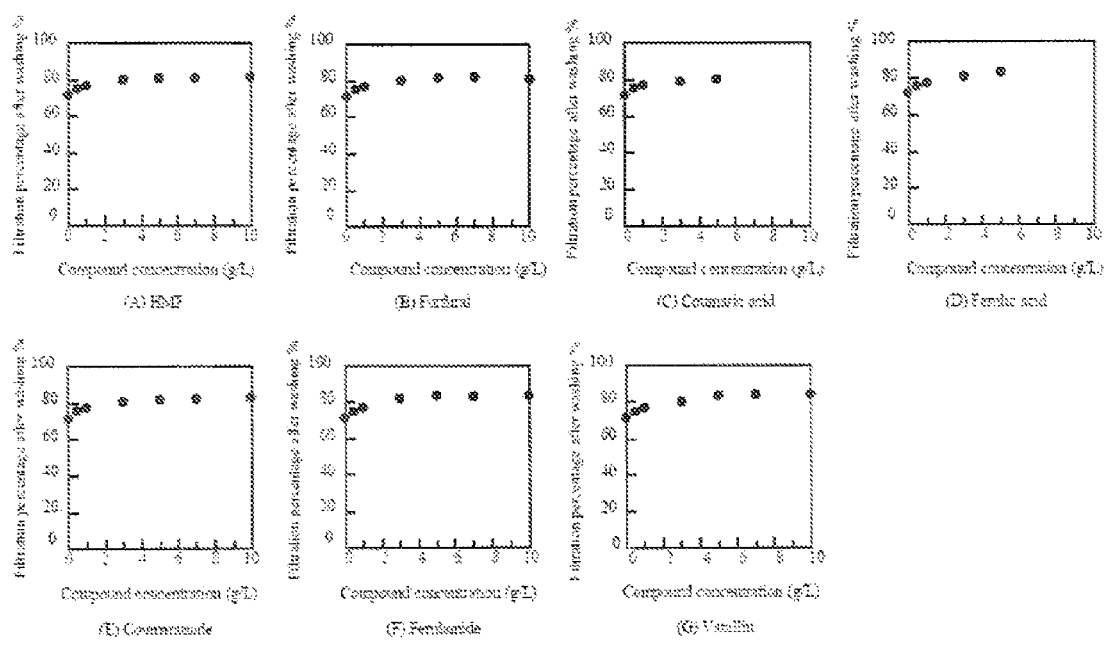
FIG. 5 is a diagram showing the relationships between the concentrations of various low-molecular-weight aromatic compounds contained in the washing liquid and the membrane filtration percentage after membrane washing.

Influence of Low-Molecular-Weight Aromatic Compound Concentration on Washing Effect Membrane washing was carried out in the same manner as in Example 5 except that 6 kinds of concentrations, 0.5 g/L, 1 g/L, 3 g/L, 5 g/L, 7 g/L and 10 g/L, were studied for each of the 7 kinds of compounds in the washing liquid (however, coumaric acid and ferulic acid were not studied for the concentrations of 7 g/L, and 10 g/L since these were insoluble at concentrations higher than 5 g/L). Values of the filtration percentage converted from the filtration flow rate according to Reference Example 2 were used to prepare the graph shown in FIG. 5. The measured value of the filtration flow rate of the unused membrane was 0.246 m/day. As is evident from FIG. 5, in any of the compounds, the membrane washing effect increased as the concentration of the compound increased, and the maximum membrane washing effect was obtained at the concentrations of not less than 5 g/L.

Example 7

Membrane Washing with Filtrate Obtained by Passing Cellulose-Derived Sugar Liquid Through Nanofiltration Membrane The cellulose-derived sugar liquid was passed through a nanofiltration membrane according to the method in Reference Example 1 to obtain an NF filtrate. A part of the NF filtrate was further subjected to filtration using a reverse osmosis membrane ("UTC-80", manufactured by Toray Industries, Inc.) at normal temperature at an operation pressure of 6 MPa, to prepare an RO concentrate containing each component at a 6-fold, 10-fold or 20-fold concentration (hereinafter referred to as 6-fold NF filtrate, 10-fold NF filtrate and 20-fold NF filtrate, respectively). The low-molecular-weight aromatic compound concentrations in each liquid were analyzed by the method in Reference Example 3. The results are shown in Table 6.

TABLE 6

| Washing liquid | HMF (ppm) | Furfural (ppm) | Coumaric acid (ppm) | Ferulic acid (ppm) | Coumaramide (ppm) | Ferulamide (ppm) | Vanillin (ppm) | Total (ppm) |
| --- | --- | --- | --- | --- | --- | --- | --- | --- |
| NF filtrate | 47 | 175 | 188 | 149 | 1 | 3 | 7 | 570 |
| 6-fold NF filtrate | 277 | 1070 | 1074 | 864 | 6 | 15 | 44 | 334 |
| 10-fold NF filtrate | 461 | 1788 | 1828 | 1474 | 9 | 25 | 72 | 5658 |
| 20-fold NF filtrate | 926 | 3577 | 3769 | 2889 | 19 | 51 | 143 | 11373 |

Membrane washing was carried out under the same conditions as in Example 5 using the above-described NF filtrate, 6-fold NF filtrate, 10-fold NF filtrate or 20-fold NF filtrate as the washing liquid or the pure water in Example 5 as the washing liquid. Values of the filtration percentage converted from the filtration flux according to Reference Example 2 are shown in Table 7. The measured value of the filtration flux of the unused membrane was 0.246 m/day. As is evident from Table 7, the membrane washing effect increased as the low-molecular-weight aromatic compound concentration increased.

TABLE 7

| Washing liquid | Filtration percentage after washing (%) |
| --- | --- |
| (Control) Pure water | 72 |
| NF filtrate | 76 |
| 6-fold NF filtrate | 79 |
| 10-fold NF filtrate | 81 |
| 20-fold NF filtrate | 82 |

INDUSTRIAL APPLICABILITY

Our methods can be used to wash a separation membrane(s) in a method of producing a sugar liquid, the method comprising the step of filtering a cellulose-derived sugar liquid through one or more separation membranes selected from the group consisting of ultrafiltration membranes, nanofiltration membranes and reverse osmosis membranes.

The invention claimed is:

1. A method of producing a sugar liquid, comprising:
   filtering a cellulose-derived sugar liquid through one or more separation membranes selected from the group consisting of ultrafiltration membranes, nanofiltration membranes and reverse osmosis membranes, and
   washing the separation membrane(s) after filtration with warm water at a temperature of 50 to 90° C.,
   wherein said warm water comprises one or more compounds selected from the group consisting of ferulamide, coumaric acid, ferulic acid, coumaramide and vanillin.

2. The method according to claim 1, wherein said warm water further comprises at least one of HMF and furfural.

3. The method according to claim 2, wherein said warm water is a filtrate obtained by passing a cellulose-derived sugar liquid through a nanofiltration membrane(s) and/or reverse osmosis membrane(s).

4. The method according to claim 2, wherein the temperature of said warm water is 75 to 90° C.

5. The method according to claim 2, wherein said cellulose-derived sugar liquid is a cellulose-derived sugar liquid previously filtered through a microfiltration membrane(s).

6. The method according to claim 2, wherein the pH of said warm water is 9 to 12.

7. The method according to claim 1, wherein said warm water is a filtrate obtained by passing a cellulose-derived sugar liquid through a nanofiltration membrane(s) and/or reverse osmosis membrane(s).

8. The method according to claim 7, wherein the temperature of said warm water is 75 to 90° C.

9. The method according to claim 7, wherein the pH of said warm water is 9 to 12.

10. The method according to claim 1, wherein the temperature of said warm water is 75 to 90° C.

11. The method according to claim 10, wherein said cellulose-derived sugar liquid is a cellulose-derived sugar liquid previously filtered through a microfiltration membrane(s).

12. The method according to claim 10, wherein the pH of said warm water is 9 to 12.

13. The method according to claim 1, wherein said cellulose-derived sugar liquid is a cellulose-derived sugar liquid previously filtered through a microfiltration membrane(s).

14. The method according to claim 13, wherein the pH of said warm water is 9 to 12.

15. The method according to claim 1, wherein the pH of said warm water is 9 to 12.

16. The method according to claim 1, wherein said warm water comprises one or more compounds selected from the group consisting of coumaric acid, ferulic acid, coumaramide, ferulamide and vanillin at a total concentration of 500 to 10,000 ppm.

* * * * *